Patented Feb. 25, 1936

2,032,133

UNITED STATES PATENT OFFICE 2,032,133

DISAZO DYESTUFF AND ITS PRODUCTION

Adolf Krebser, Basel, Switzerland, assignor to the firm J. R. Geigy A. G., Basel, Switzerland No Drawing. Application March 20, 1935, Serial No. 12,108. In Germany April 12, 1934

2 Claims. (Cl. 260—77)

This invention relates to the manufacture of disazo dyestuffs by coupling a tetrazotized diamino base according to the following general formula:

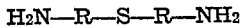
$H_2N—R—S—R—NH_2$ wherein R is an aromatic residue, with a para substituted phenol capable of being coupled and containing no sulphonic or carboxylic group, so as to form a disazo dyestuff. The new dyestuffs thus obtained are very suitable for dyeing cellulose ester lacquers, spirit lacquers, oils and fats and also for use in the graphic arts, for instance, copper-block printing.

The U. S. Patent No. 1,819,957 discloses the use of similar dyestuffs from diamino bases of the di- or tri-arylmethane series and amines and phenols capable of being coupled for dyeing fats and oils. As compared with the older dyestuffs for fats these dyestuffs are distinguished by the fact that they have new properties which, for the first time, makes it possible to use dyestuffs of this kind for graphic purposes, for example, in producing two-tone colors in copper-block printing.

When, however, in accordance with the present invention, the $—CH_2—$ or $—CHR—$ group in the diamino base of the aforesaid patent is replaced by sulphur as mono-atomic link member for uniting the two aromatic bases, there are obtained by tetrazotizing and coupling with para-substituted phenols disazo dyestuffs insoluble in water which are distinguished by very good solubility in the solvents and varnish mixtures used in the graphic art and are differentiated from the known dyestuffs by a much better fastness to light and by a considerably greater coloring power. This difference in coloring power is surprising; there is nothing in literature or in technical knowledge which would lead one to suppose that the difference might exist.

The following example illustrates the invention:—

21.6 kilos of thio-aniline (4,4'-diamino-diphenyl-sulphide) are tetrazotized in the usual manner and the product is coupled in solution alkaline with sodium carbonate with 21.6 kilos of 4-hydroxy-1-methylbenzene. The yellow-orange powder thus produced dissolves in concentrated sulphuric acid to a brown-red solution and dyes mixtures of nitro-cellulose and acetyl-cellulose and the mixtures of resins and solvents used in copper-block printing pure yellow tints. The solubility in these mixtures is remarkable; the depth of color is nearly double that of the already known dyestuffs, for example, those of U. S. Patent No. 1,819,957.

What I claim is:—

1. A process for the manufacture of a disazo dyestuff, insoluble in water, consisting in coupling tetrazotized thio-aniline with 4-hydroxy-1-methylbenzene.

2. Disazo dyestuff, insoluble in water, of the following formula

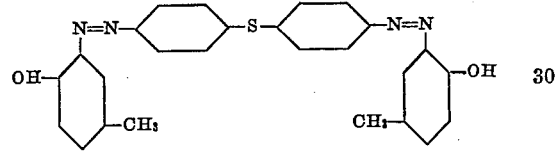

said dyestuff having a great coloring power and a good fastness to light and being suitable for dyeing cellulose ester lacquers, spirit lacquers, oils and fats and also for use in the graphic arts.

ADOLF KREBSER.